United States Patent [19]
Ryan et al.

[11] Patent Number: 6,108,585
[45] Date of Patent: Aug. 22, 2000

[54] PROBABILISTIC DISPATCHING METHOD AND ARRANGEMENT

[75] Inventors: Patrick J. Ryan, Kyle; Michael R. Conboy, Austin, both of Tex.

[73] Assignee: Advanced Micro Devices, Inc., Sunnyvale, Calif.

[21] Appl. No.: 08/990,059

[22] Filed: Dec. 12, 1997

[51] Int. Cl.[7] .............................. G06F 19/00; G06F 17/00
[52] U.S. Cl. .............................. 700/112; 700/95; 700/99; 700/121
[58] Field of Search .............................. 700/99, 100, 106, 700/112, 115, 116, 121, 213, 214

[56] References Cited

U.S. PATENT DOCUMENTS

| | | | |
|---|---|---|---|
| 4,829,445 | 5/1989 | Burney | 700/230 |
| 5,467,285 | 11/1995 | Flinn et al. | 700/95 |
| 5,493,501 | 2/1996 | Kondo | 700/95 |
| 5,737,228 | 4/1998 | Ishizuka et al. | 700/102 |
| 5,805,452 | 9/1998 | Anthony et al. | 700/142 |
| 5,838,566 | 11/1998 | Conboy et al. | 700/115 |
| 5,867,388 | 2/1999 | Okumura et al. | 700/112 |
| 5,880,960 | 3/1999 | Lin et al. | 700/99 |
| 5,889,673 | 3/1999 | Pan et al. | 700/97 |

*Primary Examiner*—William Grant
*Assistant Examiner*—Zoila Cabrera

[57] ABSTRACT

A probabilistic dispatching method and arrangement for directing the movement of wafers in a manufacturing process. In a manufacturing process, some process steps may be performed by tools at alternate locations. Delivery of the material from one manufacturing process step to the next occurs via a rail for transporting the material and stockers for holding the material until the processing can commence. While awaiting processing, material may be moved from one stocker to a stocker at an alternate location and then removed for processing. A distribution of removal events is maintained for process steps having alternate locations, wherein a removal event refers to removal of material from a stocker for processing. When material is returned to a stocker for delivery to another stocker to await a subsequent processing step, the other stocker is identified as a function of the distribution of removal events for the subsequent processing step.

23 Claims, 8 Drawing Sheets

| | STOCKER IDs/LOCATIONS | | | | |
|---|---|---|---|---|---|
| | 1 | 2 | 3 | 4 | 5 |
| PROCESS STEP 1 | EVENT TOTAL = 0 | EVENT TOTAL = 20 | EVENT TOTAL = 40 | EVENT TOTAL = 30 | EVENT TOTAL = 10 |

FIG.5B

| | STOCKER IDs/LOCATIONS | | | | |
|---|---|---|---|---|---|
| | 1 | 2 | 3 | 4 | 5 |
| PROCESS STEP 1 | CUM. PROB. = 0.00 | CUM. PROB. = 0.20 | CUM. PROB. = 0.60 | CUM. PROB. = 0.90 | CUM. PROB. = 1.00 |

FIG.7

PROBABILISTIC DISPATCHING METHOD AND ARRANGEMENT

BACKGROUND OF THE INVENTION

This invention relates generally to the fabrication of integrated circuits on semiconductor wafers, and more particularly to the logistics of moving wafers for processing during the fabrication.

A fabrication plant is usually divided into separate areas for particular portions of the fabrication process. Each processing area is called a bay, and each bay contains equipment that is required to process wafers for a certain purpose. In addition to the equipment, material stockers are present near the bay. A material stocker is a large automated cabinet where wafers are stored while waiting to be processed. The wafers are stored in cassettes, and each cassette can hold up to twenty-five wafers. A lot is a logical grouping of wafers in a cassette. The lot can migrate from cassette to cassette as it progresses through the chain of production processes.

A material stocker can hold hundreds of cassettes and services two bays. When a cassette of wafers is ready to be stored in a material stocker, the operator places the cassette at one of the input ports of the material stocker.

When an operator wishes to retrieve a lot from a material stocker, he issues a request via the application program of the host computer. The operator may need empty cassettes to configure or process the wafers. Empty cassettes may be stored in a material stocker, so the operator must have the capability to request empty cassettes. In addition to manipulation of the wafers, the operator may also need to manipulate, or set up, the equipment for an operation.

Once a lot has been retrieved, and the equipment has been set up, the operation on the wafers by a particular piece of equipment, or "tool," can begin. At this point, the lot is moved-in to the operation. This state is indicated to the host application by the operator for the lot. The lot remains in this state until the operation is completed. Once the operation is completed, the operator must perform tests and verifications on the wafers. When all tests and verifications have been performed, the host computer application program must be notified. Wafers may have moved from one cassette to another as a result of the operation. The host application has to be notified of this. The operator then places the cassette of "moved-out" wafers in the material stocker, to await orders as to the location of the next piece of equipment which will perform operations on the wafers.

Some present material handling systems exhibit excess movement of materials through the system which negatively impacts manufacturing throughput. In an example system, there are multiple locations that are available for a particular manufacturing process step. However, the system only provides mappings for one location per manufacturing process step. Therefore, the system does not know that there are alternate locations available for performing the processing step. When the AMHS dispatches material to a particular location, and the stocker associated with that location is unavailable, the material is redirected to an adjacent stocker or temporary storage. If other locations are available to perform the processing step, a move request is required to transfer the material from a stocker, such as the adjacent stocker, to the desired location. The AMHS then moves the material to the stocker at the specified location, and the material is then removed and processed. Therefore, in order to move the material to the location where it is ultimately processed in the example scenario, two moves were required. A first move was required to move the material to the location adjacent to the programmed location, and the second move was required to transfer the material to the location where the material was ultimately processed. It would be desirable, therefore, to reduce the movement of material in an AMHS.

SUMMARY OF THE INVENTION

The present invention is directed to a system and method for directing the movement of material in a manufacturing environment. In a first aspect of the invention, a method is provided for routing material in a computer controlled manufacturing arrangement having alternate locations for predetermined ones of a plurality of manufacturing process steps. The method comprises the steps of: establishing a distribution of events indicative of the alternate locations at which material is processed for a manufacturing process step; identifying a next manufacturing process step for the material received for dispatch; and selecting one of a plurality of alternate locations to which to route the material for the next manufacturing process step as a function of a distribution of events associated with a plurality of alternate locations of the next manufacturing process step.

In another aspect of the invention, an apparatus is provided for routing material in a computer controlled manufacturing arrangement having alternate locations for predetermined ones of a plurality of manufacturing process steps. The apparatus comprises: means for establishing a distribution of events indicative of the alternate locations at which material is processed for a manufacturing process step; means for identifying a next manufacturing process step for material received for dispatch; and means for selecting one of a plurality of alternate locations to which to route the material for the next manufacturing process step as a function of a distribution of events associated with a plurality of alternate locations of the next manufacturing process step.

An automated manufacturing arrangement for routing material between locations in a factory floor is another aspect of the invention. The arrangement comprises: a material movement rail; a plurality of stockers coupled to the rail and arranged to transfer material to and from the rail, each stocker providing temporary storage of material for a manufacturing process step at a respective location, and at least one manufacturing processing step is performed at alternate locations; and a data processing system coupled to the stockers and configured and arranged to record a distribution of removal events indicative of the alternate locations at which material is removed from stockers and processed for manufacturing process steps, and to dispatch material to stockers for subsequent manufacturing processing steps as a function of a distribution of removal events.

The above Summary of the Invention is not intended to describe each disclosed embodiment of the present invention.

BRIEF DESCRIPTION OF THE DRAWINGS

Other aspects and advantages of the present invention will become apparent upon reading the following detailed description and upon reference to the drawings in which.

While the invention is amenable to various modifications and alternative forms, specifics thereof are shown by way of example in the drawings and in the written description. It should be understood, however, that the intention is not to limit the invention to the particular embodiments described. On the contrary the intention is to cover all modifications, equivalents, and alternatives falling within the spirit and scope of the invention as defined by the appended claims.

DETAILED DESCRIPTION

Figure 1:
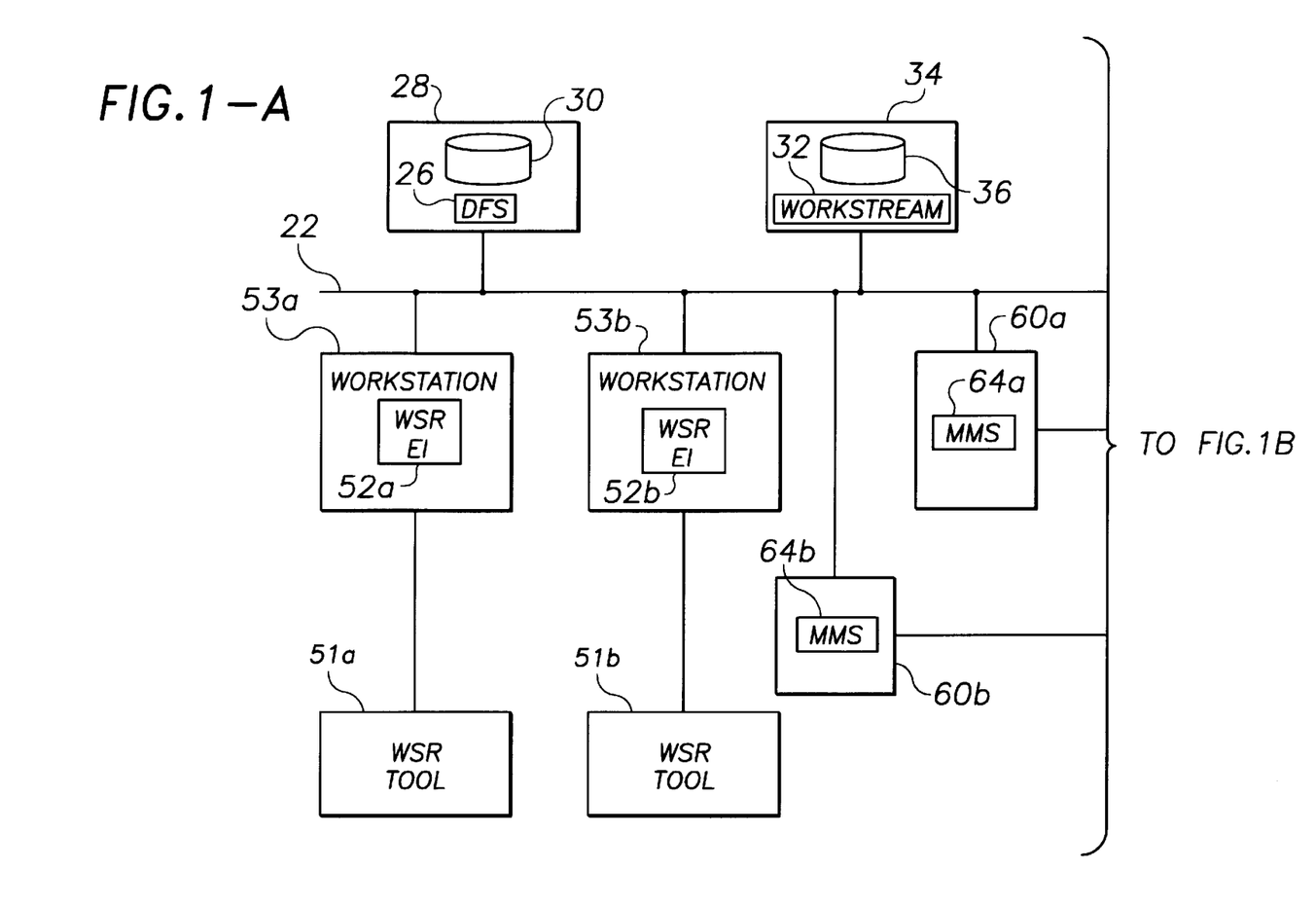
FIG. 1 is a schematic diagram depicting the architecture of a control system for the fabrication of integrated circuits.

Referring first to FIG. 1, the reference numeral 20 refers, in general, to a control system for the fabrication of integrated circuits on semiconductor wafers. The control system 20 has a central bus 22 to which the various control elements are coupled. The language, or protocol used on the bus 22 is called ISIS and is sold by ISIS Distributed Systems. A personal computer 24 is coupled to the bus 22 for ad hoc access to all movement functions for the cassettes and wafers.

A distributed factory system (DFS) computer program 26 sold by Consilium, Inc. is resident on a UNIX workstation 28. The UNIX workstation 28 connects to the bus 22 for controlling, by use of the DFS 26, the manufacturing process of the wafers. The DFS 26 does this by tracking the handling of wafers by logical lots. A database 30 for use by the DFS 26, for supplying the needed information to the DFS 26, is also resident on the workstation 28. The database 30 is also supplied by Consilium, Inc. with the DFS 26.

The DFS 26 is the newest version of Consilium's older computer program 32, called "WorkStream Open" or "WorkStream" for short. The program 32 is resident on a UNIX workstation 34, which is also used to control the manufacturing process of the wafers. A database 36 for use by the WorkStream program 32, for supplying the needed information to the WorkStream program 32, is also resident on the workstation 34. The database 36 is supplied by Consilium, Inc. with the WorkStream program 32.

Tools 38a through 38p used in the manufacturing process of the semiconductor wafers are coupled to the bus 22 via Hewlett Packard work stations 40a through 40p, running equipment interface ("EI") programs 41a through 41p, respectively. The equipment interface programs 41a through 41p function as translators between the language of the tools and the ISIS language of the bus 22.

CSM computers 42a through 42d are coupled to the bus 22 via Hewlett Packard work stations 44a through 44d, running equipment interface ("EI") programs 45a through 45d, respectively. The CSMs 43a–d of computers 42a–d are coupled to the EIs 45a–d of computers 44a via a SECS II protocol and RS232 connections between computers 42a–d and 44a–d, respectively.

In an example embodiment, each stocker 46a–d is controlled by a separate CSM computer 42a–d. In another embodiment, one CSM computer controls up to three stockers. The computers 42a–42d run Sunsoft's "Interactive UNIX" as an operating system, and CSM application programs 43a through 43d, licensed by Daifuku. The computers 42a–42d are inter-coupled to each other via an ethernet.

The CFM program 48 on computer 47 is coupled to and controls all the CSM computers 42a–42d. Computer 47 is also coupled to the bus 22. The CFM program 48 functions as a global database manager for the CSMs 43a–d and passes misdirected messages to the correct object.

The computers 42a–42d schedule movement of the cassettes in and out of material stockers, schedule movement of the cassettes on an overhead cassette monorail, and keep track of all the cassettes in each stocker, and the lot numbers assigned to each stocker. Because of these functions which they perform, the personal computers 42a–42d are referred to as clean stocker managers (CSM). Four material stockers 46a through 46d connect to the personal computers 42a–42d for storing empty cassettes and cassettes of wafers.

Note that CSMs 43a–d are shown in a distributed environment. In an alternate embodiment, a single centralized CSM can be configured and arranged to control all the stockers. Selection of a distributed versus a centralized CSM depends upon particular manufacturing requirements.

When a lot is entered into a stocker, stocker 46a, for example, the cassette identifier containing the lot is read and the information is forwarded from the CSM 43a to the appropriate one of DFS computers 28 or 34 via EI 45a. The DFS then looks up the next operation and destination for the lot. Note that present DFSs, as exemplified by DFS 26 and WorkStream 32, only identify a single next destination and operation. The next operation and destination are forwarded to the CSM 43a.

In accordance with the present invention, when an example CSM 43a receives the next operation and destination, the CSM 43a performs its own selection of a destination (stocker) where there are multiple destinations at which the designated operation may be performed. As explained in further detail later in this document, a record is kept of destinations (stockers) from which lots are removed for performing respective operations. As a function of the record of removal events, CSMs 43a–d select next destinations according to the most likely destinations at which lots will be removed for performing the operations, respectively.

Two wafer ID servers (WIDS) 49a, 49b, which are computer programs resident on UNIX workstations 50a, 50b, respectively, maintain information regarding the wafers in WIDS databases 56a, 56b respectively. Databases 56a, 56b are resident on UNIX workstations 54a, 54b, respectively. The WIDS 49a, 49b maintain in the databases 56a, 56b wafer IDs, positions of the wafers within the cassettes, and the process steps through which each wafer passes. The WIDS database 56a is a backup database to the WIDS database 56b, for providing redundancy.

Wafer sorters (WSR) 51a, 51b are tools that move wafers within and/or between cassettes. They also verify the identity of wafers and cassettes, sort wafers, and split and merge lots. The WSR 51a, 51b are coupled to the bus 22 via WSR equipment interface programs 52a, 52b, respectively, resident on Hewlett Packard workstations 53a, 53b, respectively. The WSR equipment interface programs 52a, 52b act as translators between the language of the WSR 51a, 51b and the ISIS language of the bus 22.

Two workstations 60a, 60b are coupled to the bus 22 and to the workstations 54a, 54b, for access to MMS databases 62a, 62b. The two MMS databases 62a, 62b contain the original cassette IDs, the colors of the cassettes (zone restrictions), cassette tags, lots-to-tags mapping, and configuration information regarding the stockers 46. The two MMS databases 62a, 62b are also used to validate the cassette Ids. In an alternate embodiment, the two MMS databases 62a, 62b are extensions of the Workstream database 36.

The two MMS programs 64a, 64b mesh the two WIDS 49a, 49b and the two MMS databases 62a, 62b with the DFS program 26 and with the WorkStream program 32, using the ISIS bus protocol. The MMS programs 64a, 64b allow a requester to retrieve a cassette tag or ID for a given lot ID, or retrieve a lot ID for a given cassette ID.

The MMS programs 64a, 64b provide facilities for accessing lot and carrier data for shop floor control, provide protocols to external entities to facilitate movement of the wafers on the shop floor, provide user interfaces for ad-hoc use by operators, and are sensitive to time-out values when interacting with the equipment interfaces 45a through 45d.

Figure 2:
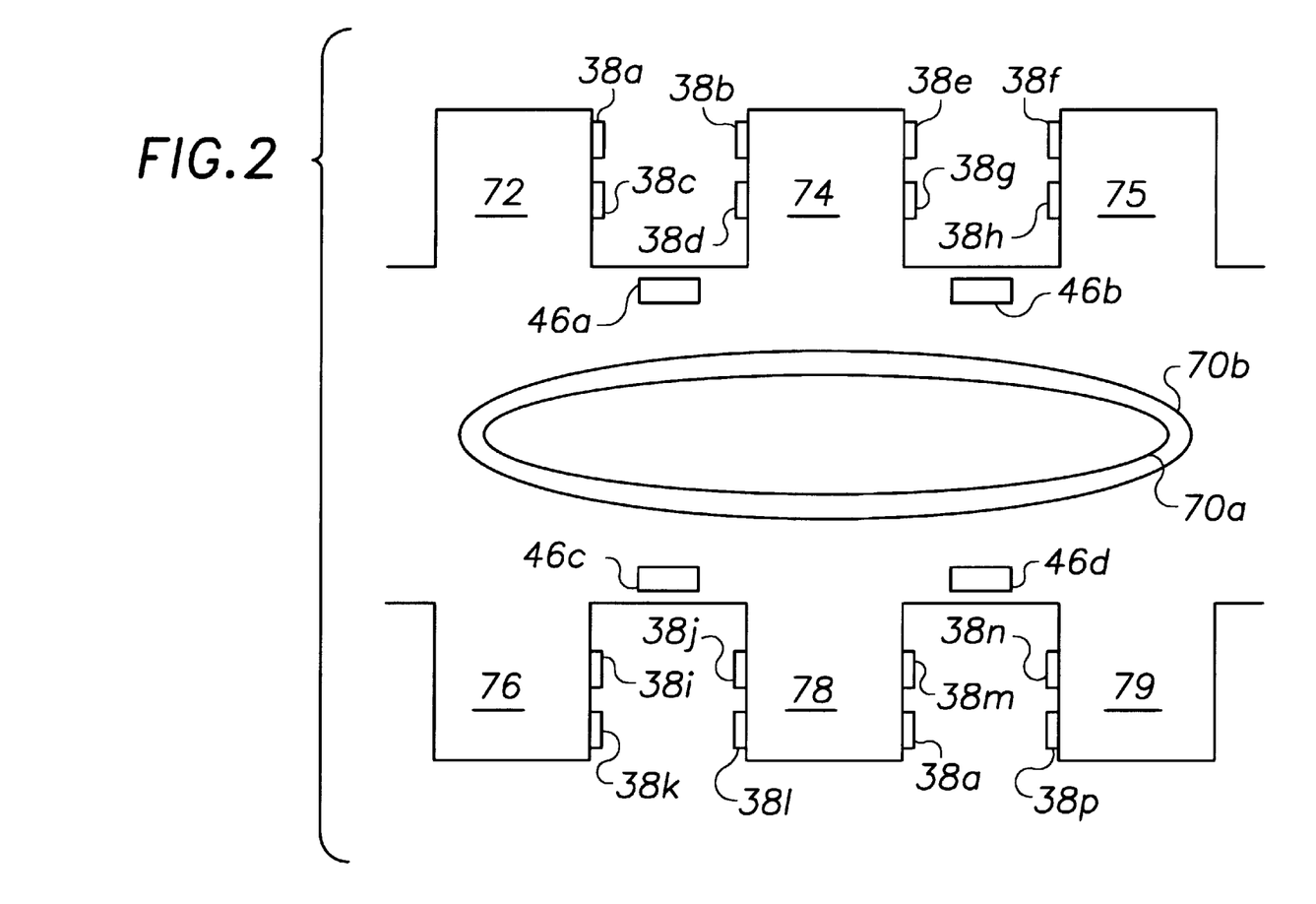
FIG. 2 is a schematic diagram showing the physical layout of a shop floor.

Referring to FIG. 2, monorails 70a, 70b carry the cassettes to and from the stockers 46a–d. The tools 38a–38p are located at bays 72, 74, 75, 76, 78, and 79. Monorails 70a–b and stockers 46a–d are conventional.

In an example method according to the present invention, material movement in an AMHS is directed as a function of historical move request information. In the example method, AMHS stocker locations from which material is removed and the associated process step for the move request are captured. The information is stored in a table having indices for stocker IDs/locations and indices for process steps. This table is called the historical removal table.

Entries in the historical removal table are updated in the following manner. When material is removed from a stocker for performing a process step thereon, the event is added to an entry in the historical removal table for the particular stocker and process step. After each event, the distribution of removal of material from stockers and process steps as set forth in the historical removal table is converted to data for the cumulative probability table. In an alternate embodiment, the data from the historical removal table may be converted to the cumulative probability table periodically.

In an example embodiment, the historical removal table includes a total of removal events for each stocker/process-step pair. In addition, each stocker/process-step pair includes an ordered list of associated removal events, each of the removal events including a time-stamp indicative of a relative time at which the removal event occurred.

The ordering of removal events and their associated time-stamps support deletion of old removal events from the historical removal table. For temporary process perturbations, it may be desirable to flush such old events from the historical removal table. Selection of removal events to flush from the table can be as a function of the x oldest removal events, or by removal events having time-stamps prior to a selected time.

In flushing removal events from the table, in some circumstances it will be desirable to leave some removal events in the table, even though the events fit the selection criteria. Therefore, an operator initiated, manual override function leaves selected removal events in the table during a flush operation.

The cumulative probability table, similar to the historical removal table, has indices for stocker IDs/locations and indices for process step IDs. The cumulative probability table is used when material enters the AMHS for dispatch. In dispatching, the AMHS generates a random number between zero and one. The random number and the identifier for the next process step are used as the lookup variables in the cumulative probability table. The stocker ID/location identified from the cumulative probability table identifies where the material will be sent.

Figure 3:
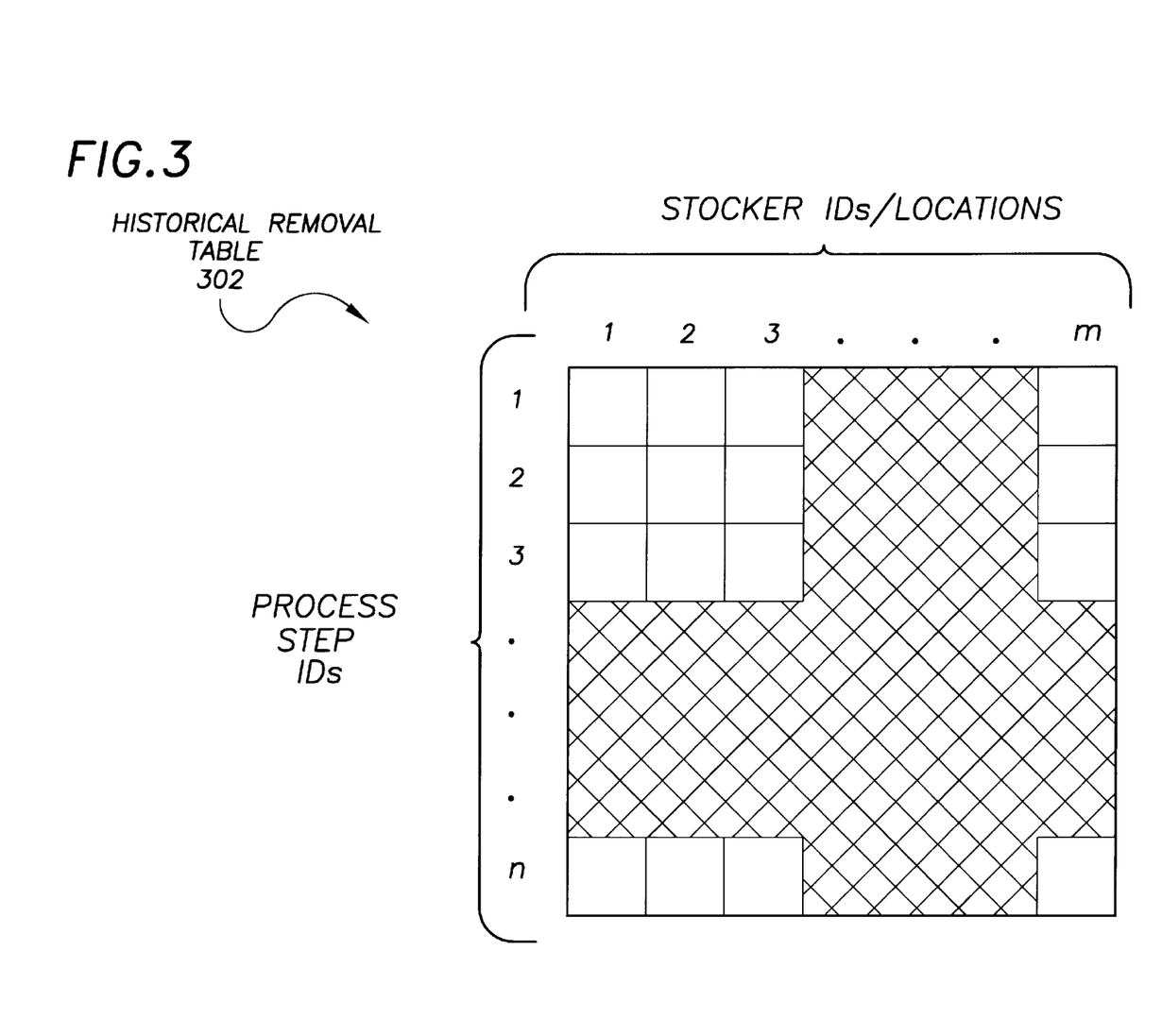
FIG. 3 illustrates an example historical removal table.

FIG. 3 illustrates an example historical removal table 302. Historical removal table 302 is a two-dimensional array having columns that are indexed by stocker IDs/locations and rows that are indexed by process step IDs. Over a predetermined duration, each entry in the historical removal table 302 contains the total number of removal events for the indexing process step ID and stocker ID/location. For example, for process step ID 3 at stocker ID/location 1, the entry in the historical removal table 302 contains the total number of times that material was removed from stocker ID/location 1 and process step 3 was performed on that material.

Figure 4:
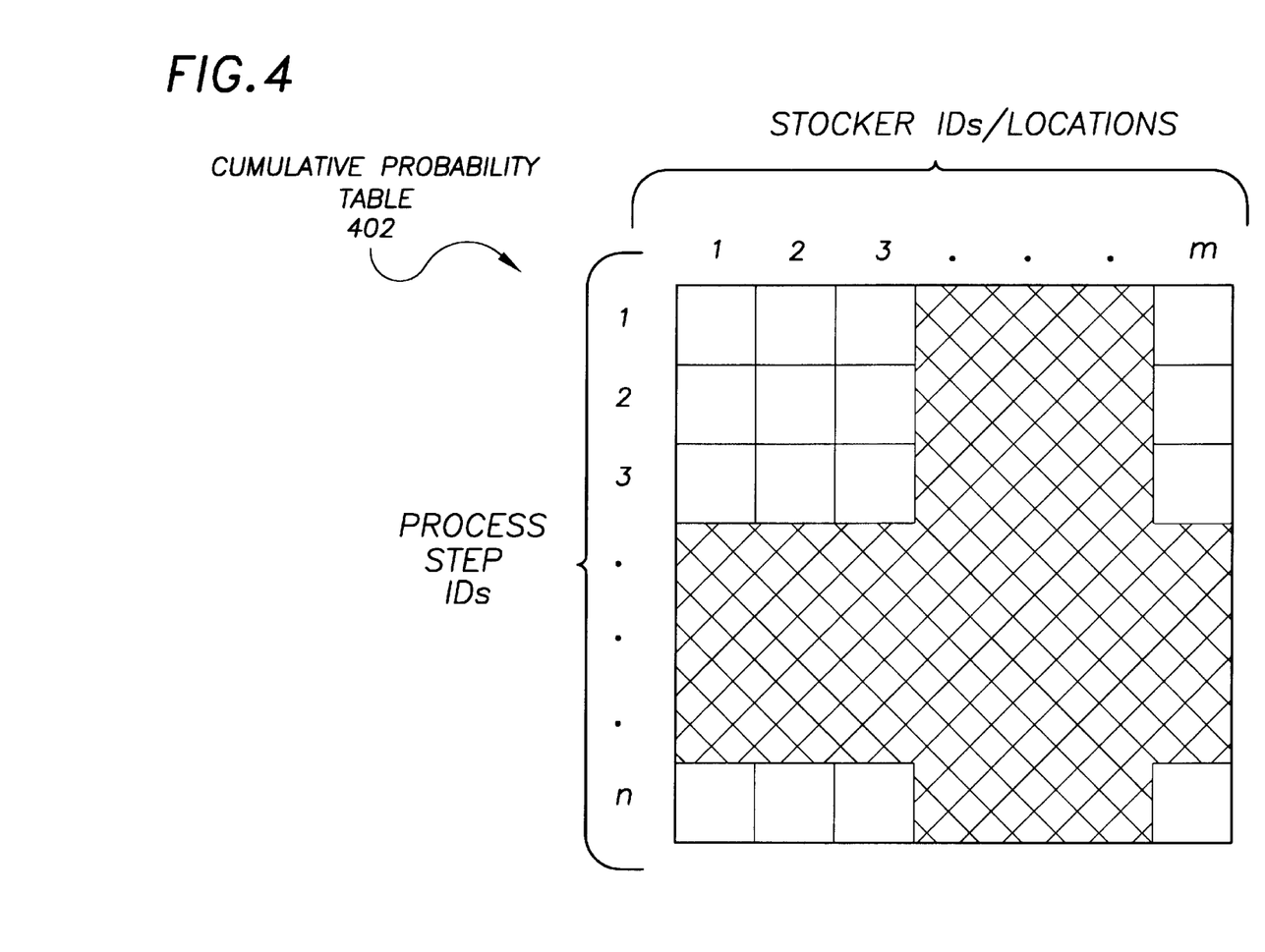
FIG. 4 illustrates an example cumulative probability table.

FIG. 4 is an example of cumulative probability table 402. Cumulative probability table 402 is a two-dimensional array having rows that are indexed by process step IDs and columns that are indexed by stocker IDs/locations. For each row in table 402, the values in the entries comprise a cumulative probability distribution for the associated process step ID and stocker IDs/locations.

Figure 5A:
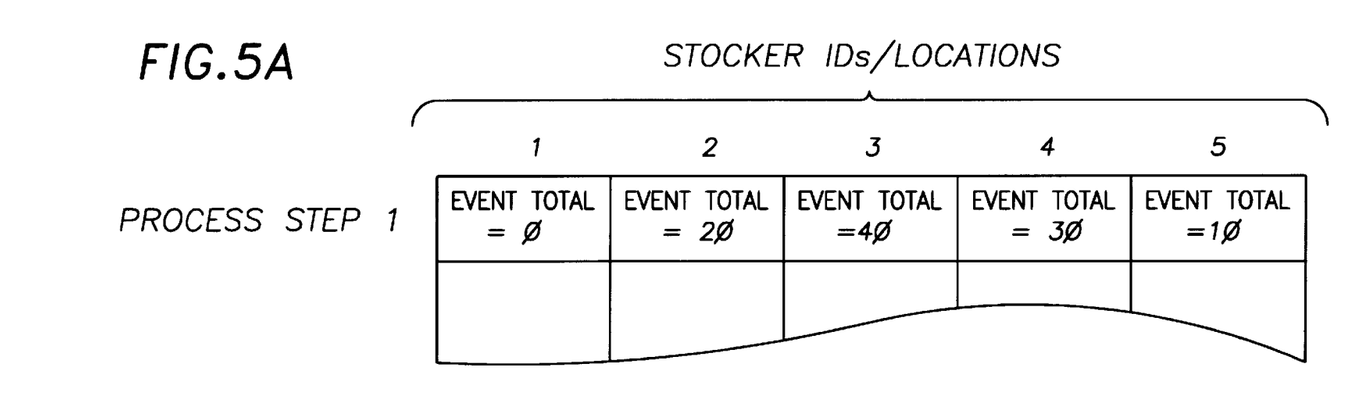
FIGS. 5A and 5B illustrate example entries in the historical removal table and the cumulative probability table for an example process step.
Figure 5B:
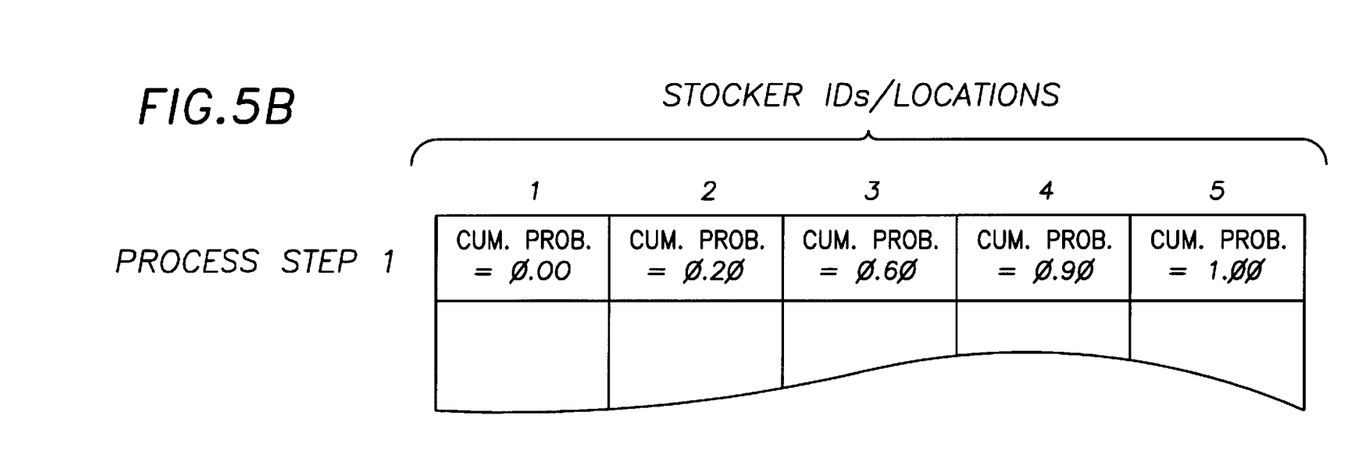

FIGS. 5A and 5B illustrate, respectively, a row of historical removal table 302 and a corresponding row of cumulative probability table 402. The example rows are for process step 1. Referring first to FIG. 5A, the removal event totals are as follows: For process step 1 that has stocker IDs/locations 1, 2, 3, 4, and 5, the respective event totals are 0, 20, 40, 30, and 10. That is, for a predetermined duration, no material was removed from stocker ID/location 1 for performing process step 1, 20 removals of material from stocker ID/location 2 occurred for performing process step 1, 40 removals of material from stocker ID/location 3 occurred for performing process step 1, 30 removals of material from stocker ID/location 4 occurred for performing process step 1, and 10 removals of material from stocker ID/location 5 occurred for performing process step 1. The distribution of events for process step 1 is converted into a cumulative probability distribution for process step 1, as shown in FIG. 5B.

Figure 6:
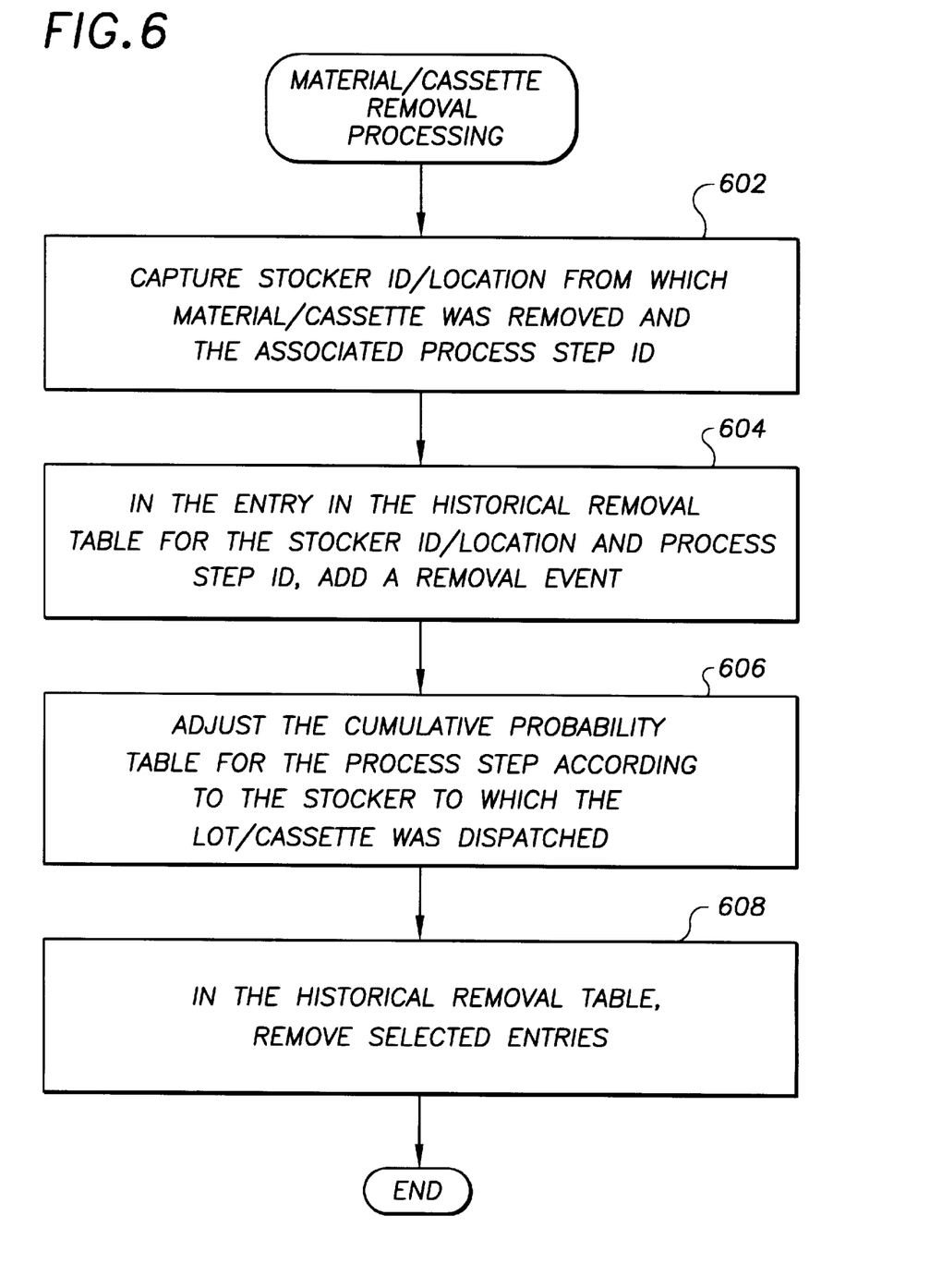
FIG. 6 is a flowchart of an example method for establishing values for entries in the historical removal table and in the cumulative probability table.

FIG. 5B illustrates the cumulative probability distribution for process step 1 and associated stocker IDs/locations 1, 2, 3, 4, and 5. Each entry in the cumulative probability table is computed according to the following formula:

Cumulative Probability Table $$[i, j] = \frac{\sum_{k=1}^{j} HRT[i, k]}{\sum_{l=1}^{n} HRT[i, l]}$$

i=the process ID
j=the stocker IDs/locations
HRT=the historical removal table
n=the number of stocker IDs/locations represented in the historical removal table for process IDj FIG. 6 is a flowchart of an example method for processing when material is removed from a stocker at a location. The illustrated processing relates to updating the historical removal table and updating the cumulative probability table. At block 602, the method captures the stocker ID/location from which material was removed and the associated process step ID of the process to be performed on the material. Continuing now at block 604, the entry in the historical removal table that is indexed by the stocker ID/location and process step ID is incremented with a removal event. The cumulative probability table 402 is updated at step 606. Note that it may not be desirable to update the cumulative probability table 402 every time material is removed from a stocker because of the computational overhead involved in updating table 402. In an alternate embodiment, cumulative probability table 402 is updated at predetermined intervals. In yet another embodiment, cumulative probability table 402 is updated once every x removal events, where x is either pre-programmed or specified by an operator.

Continuing now at block 608, selected entries in historical removal table 302 are periodically cleared. Clearing entries in historical removal table 302 allows for temporary process perturbations, thereby reducing the effect of such perturbations on the cumulative probability table 402 and on dispatches of material.

Figure 7:
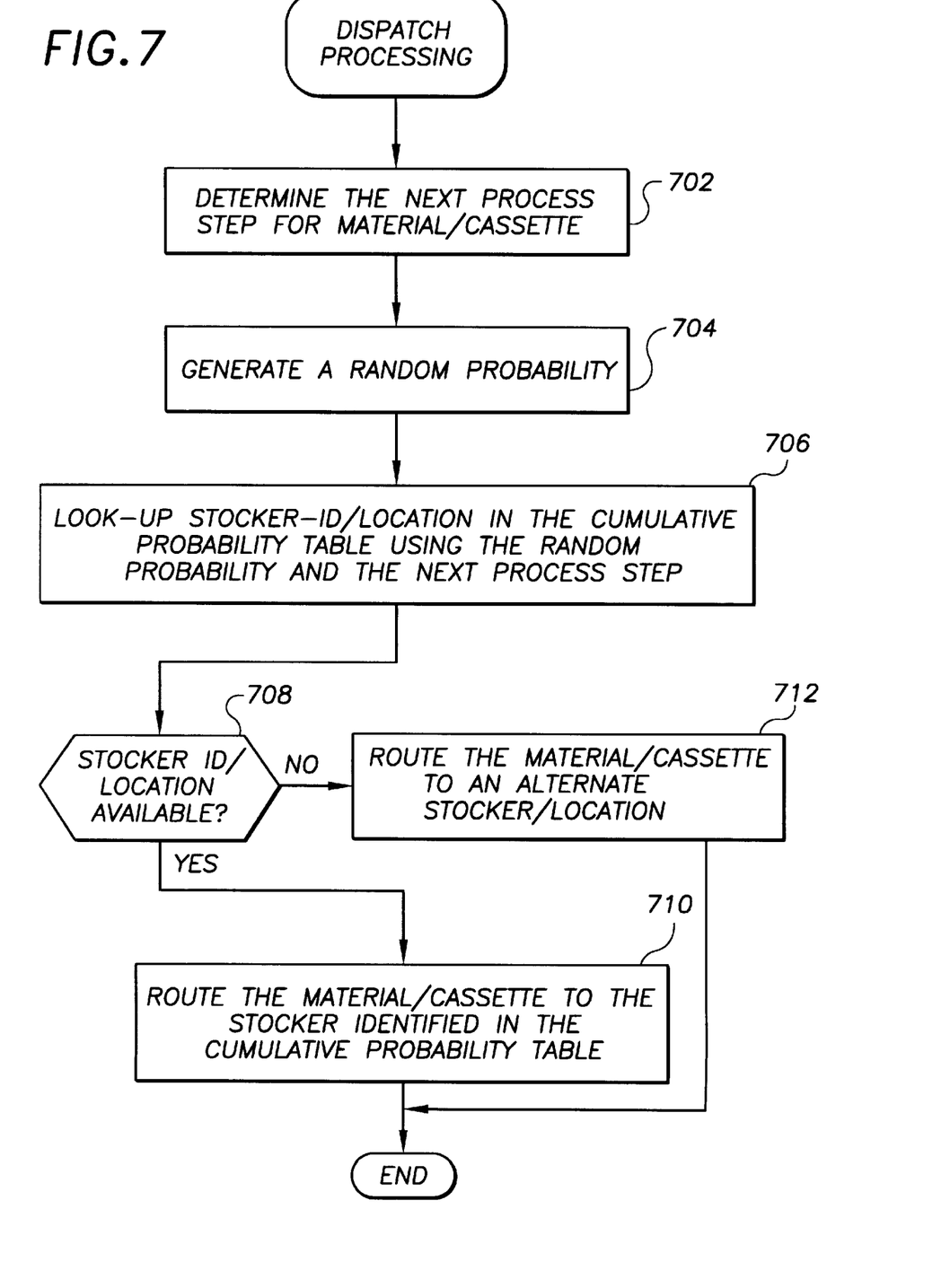
FIG. 7 is a flowchart of an example method for dispatching materials to a location using the cumulative probability table.

FIG. 7 is a flowchart of an example method for dispatching material to a stocker/location for further processing. When material is returned to the AMHS, the next process step for the material must be determined, as shown by block 702. At block 704, a random probability value, between zero and one, is generated. The process step identifier from block 702 and the random probability from block 704 are used to identify a stocker ID in the cumulative probability table 402. Returning to the example illustrated in FIG. 5B, if process step 1 is identified, and an example generated random probability value is 0.37, stocker ID/location 3 is selected. Stocker ID/location 3 is selected because for process step 1, the generated random probability of 0.37 is greater than or equal to the cumulative probability of 0.20 for stocker ID/location 2 and less than the cumulative probability of 0.60 for stocker ID/location 3.

Continuing now at block 708, if the stocker ID/location is available, control is directed to block 710, and the material is routed to the identified stocker ID/location. If, however, the stocker ID/location identified at block 706 is not available, control is directed to block 712. At block 712, an alternate stocker/location is selected, and the material is routed thereto.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for routing material in a computer controlled manufacturing arrangement having alternate locations for predetermined ones of a plurality of manufacturing process steps, comprising the steps of:
   establishing a distribution of events indicative of the alternate locations at which material is processed for a manufacturing process step;
   generating ranges of relative probability figures for the respective alternate locations of the manufacturing step as a function of the distribution of events;
   identifying a next manufacturing process step for the material received for dispatch; and
   selecting one of a plurality of alternate locations to which to route the material for the next manufacturing process step as a function of the relative probability figures and a distribution of events associated with a plurality of alternate locations of the next manufacturing process step.

2. The method of claim 1, further comprising the step of adjusting the distribution from the establishing step by eliminating events having attributes that match predetermined selection criteria.

3. The method of claim 2, further comprising the step of selecting another one of the plurality of alternate locations to which to route the material for the next manufacturing process step if the one alternate location is unavailable.

4. The method of claim 1, further comprising the step of selecting another one of the plurality of alternate locations to which to route the material for the next manufacturing process step if the one alternate location is unavailable.

5. An apparatus for routing material in a computer controlled manufacturing arrangement having alternate locations for predetermined ones of a plurality of manufacturing process steps, comprising:
   means for establishing a distribution of events indicative of the alternate locations at which material is processed for a manufacturing process step;
   means for generating ranges of relative probability figures for the respective alternate locations of the manufacturing step as a function of the distribution of events;
   means for identifying a next manufacturing process step for material received for dispatch; and
   means for selecting one of a plurality of alternate locations to which to route the material for the next manufacturing process step as a function of the relative probability figures and a distribution of events associated with a plurality of alternate locations of the next manufacturing process step.

6. The apparatus of claim 5, further comprising means for adjusting the distribution from the establishing step by eliminating events having attributes that match predetermined selection criteria.

7. The apparatus of claim 6, further comprising means for selecting another one of the plurality of alternate locations to which to route the material for the next manufacturing process step if the one alternate location is unavailable.

8. The apparatus of claim 5, further comprising means for selecting another one of the plurality of alternate locations to which to route the material for the next manufacturing process step if the one alternate location is unavailable.

9. A method for dispatching material in a computer controlled manufacturing arrangement having alternate locations for predetermined ones of a plurality of manufacturing process steps, comprising the steps of:
   recording events indicative of the alternate locations at which material is processed for a manufacturing process step;
   generating ranges of relative probability figures for the respective alternate locations of the manufacturing step as a function of the events from the recording step;
   identifying a next manufacturing process step for material received for dispatch;
   generating a random probability; and
   selecting one of a plurality of alternate locations to which to route the material for the next manufacturing process step, the one location having a range of probability figures that includes the random probability.

10. The method of claim 9, further comprising the steps of:
   purging events having attributes that match predetermined selection criteria; and
   regenerating the relative probability figures.

11. The method of claim 10, wherein the purging step comprises the step of purging a predetermined number of events for each alternate location of a manufacturing process step.

12. The method of claim 11, further comprising the step of selecting another one of the plurality of alternate locations to which to route the material for the next manufacturing process step if the one alternate location is unavailable.

13. The method of claim 9, further comprising the step of selecting another one of the plurality of alternate locations to which to route the material for the next manufacturing process step if the one alternate location is unavailable.

14. The method of claim 9, wherein the step of generating ranges of relative probability figures comprises the step of establishing cumulative probabilities for the alternate locations of the manufacturing process step.

15. The method of claim 9, wherein:
the step of recording events comprises the step of establishing a first table indexed by process step identifiers and location identifiers and having entries with totals for respective locations at which material is processed for respective manufacturing process steps; and
the step of generating ranges of relative probability figures comprises the step of establishing a second table indexed by process step identifiers and location identifiers and having entries with cumulative probabilities for respective alternate locations of respective manufacturing process steps.

16. An apparatus for dispatching material in a computer controlled manufacturing arrangement having alternate locations for predetermined ones of a plurality of manufacturing process steps, comprising:
means for recording events indicative of the alternate locations at which material is processed for a manufacturing process step;
means for generating ranges of relative probability figures for the respective alternate locations of the manufacturing step as a function of the events from the means for recording;
means for identifying a next manufacturing process step for material received for dispatch;
means for generating a random probability; and
means for selecting one of a plurality of alternate locations to which to route the material for the next manufacturing process step, the one location having a range of probability figures that includes the random probability.

17. The apparatus of claim 16, further comprising:
means for purging events having attributes that match predetermined selection criteria; and
means for regenerating the relative probability figures.

18. The apparatus of claim 17, wherein the means for purging comprises means for purging a predetermined number of events for each alternate location of a manufacturing process step.

19. The apparatus of claim 18, further comprising means for selecting another one of the plurality of alternate locations to which to route the material for the next manufacturing process step if the one alternate location is unavailable.

20. The apparatus of claim 16, further comprising means for selecting another one of the plurality of alternate locations to which to route the material for the next manufacturing process step if the one alternate location is unavailable.

21. The apparatus of claim 16, wherein the means for generating ranges of relative probability figures comprises means for establishing cumulative probabilities for the alternate locations of the manufacturing process step.

22. An automated manufacturing arrangement for routing material between locations in a factory floor, comprising:
a material movement rail;
a plurality of stockers coupled to the rail and arranged to transfer material to and from the rail, each stocker providing temporary storage of material for a manufacturing process step at a respective location, and at least one manufacturing processing step is performed at alternate locations; and
a data processing system coupled to the stockers and configured and arranged to record a distribution of removal events indicative of the alternate locations at which material is removed from stockers and processed for manufacturing process steps, to generate ranges of relative probability figures for the respective alternate locations of the manufacturing step as a function of the removal events from the recording, and to dispatch material to stockers for subsequent manufacturing processing steps as a function of a distribution of removal events and the relative probability figures.

23. The arrangement of claim 22, wherein the data processing system is configured and arranged, for each manufacturing process step having alternate locations, and for each dispatch of material, to generate a random probability figure and select one of a plurality of alternate locations to which to route the material for a subsequent manufacturing process step, the one location having a range of probability figures that includes the random probability figure.

* * * * *